United States Patent
Spratt

(10) Patent No.: US 7,305,212 B2
(45) Date of Patent: Dec. 4, 2007

(54) MESSAGE PASSING TO A KNOWN LOCATION

(75) Inventor: Michael P Spratt, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1175 days.

(21) Appl. No.: 09/905,775

(22) Filed: Jul. 13, 2001

(65) Prior Publication Data

US 2002/0009971 A1 Jan. 24, 2002

(30) Foreign Application Priority Data

Jul. 18, 2000 (GB) ................................ 0017460.7

(51) Int. Cl.
*H04B 7/00* (2006.01)
(52) U.S. Cl. .................. 455/41.2; 455/417; 455/456.3; 455/457; 370/338
(58) Field of Classification Search ................ 370/338; 455/41.2, 417, 456.3, 457
See application file for complete search history.

(56) References Cited

U.S. PATENT DOCUMENTS

| | | | |
|---|---|---|---|
| 5,375,161 A | 12/1994 | Fuller et al. ................. 455/417 |
| 5,428,544 A | 6/1995 | Shyu ........................... 701/117 |
| 5,652,570 A | 7/1997 | Lepkofker ................ 340/573.4 |
| 5,748,147 A | 5/1998 | Bickley et al. ............. 342/457 |
| 5,787,359 A | 7/1998 | Nagata ........................ 455/517 |
| 5,850,609 A | 12/1998 | Sugarbroad et al. ..... 455/456.1 |
| 5,875,400 A | 2/1999 | Madhavapeddy et al. ... 455/458 |
| 5,987,011 A * | 11/1999 | Toh ............................. 370/331 |
| 5,990,833 A | 11/1999 | Ahlbom et al. ............. 342/417 |
| 6,047,183 A | 4/2000 | Kingdon et al. ............ 455/440 |
| 6,078,818 A | 6/2000 | Kingdon et al. ......... 455/456.5 |
| 6,078,826 A | 6/2000 | Croft et al. .................. 455/574 |
| 6,104,712 A * | 8/2000 | Robert et al. ............... 370/389 |
| 6,130,881 A * | 10/2000 | Stiller et al. ................ 370/238 |
| 6,167,276 A | 12/2000 | Pite ........................ 455/456.3 |
| 6,212,133 B1 | 4/2001 | McCoy et al. .................. 368/9 |
| 6,236,335 B1 | 5/2001 | Goodwin, III ......... 340/825.49 |
| 6,246,883 B1 * | 6/2001 | Lee ............................. 455/507 |
| 6,313,786 B1 | 11/2001 | Sheynblat et al. ..... 342/357.02 |
| 6,327,533 B1 | 12/2001 | Chou .......................... 701/207 |
| 6,411,891 B1 | 6/2002 | Jones .......................... 701/201 |
| 6,473,031 B1 | 10/2002 | Harris .................... 342/387.09 |

(Continued)

FOREIGN PATENT DOCUMENTS

DE 199 03 909 8/2000

(Continued)

OTHER PUBLICATIONS

U.S. Appl. No. 09/905,774, filed Jul. 13, 2001, Spratt.

(Continued)

*Primary Examiner*—Quynh H. Nguyen

(57) ABSTRACT

A message is carried towards a target receiver (T) at a known location by one or more mobile entities (L,Q) that receive and pass on the message by short-range communication. The message includes an indication of the location of the target receiver (T). Before a mobile entity (L,Q) is used to carry the message, a determination is made as to whether the direction of travel of the mobile entity concerned is generally towards either the target receiver (T) or an intermediate staging post suitable for progressing the message towards the target receiver.

21 Claims, 3 Drawing Sheets

U.S. PATENT DOCUMENTS

| | | | |
|---|---|---|---|
| 6,477,353 B1 | 11/2002 | Honda et al. | 455/11.1 |
| 6,492,944 B1 | 12/2002 | Stilp | 342/387 |
| 6,549,625 B1 | 4/2003 | Rautila et al. | 380/258 |
| 6,704,283 B1 * | 3/2004 | Stiller et al. | 455/445 |
| 6,725,051 B2 | 4/2004 | Fidler | 455/456.1 |
| 2001/0053669 A1 * | 12/2001 | Kado et al. | 455/7 |
| 2002/0119788 A1 | 8/2002 | Parapudi et al. | 455/456.1 |
| 2002/0163912 A1 * | 11/2002 | Carlson | |

FOREIGN PATENT DOCUMENTS

| | | |
|---|---|---|
| EP | 0 913 965 A1 | 5/1999 |
| EP | 0 948 222 A2 | 10/1999 |
| EP | 1 133 115 A2 | 9/2001 |
| GB | 2 338 374 A | 12/1999 |
| GB | 2 339 356 | 1/2000 |
| GB | 2 342 018 A | 3/2000 |
| GB | 2 344 723 A | 6/2000 |
| GB | 2 360 914 A | 10/2001 |
| GB | 2 364 203 A | 1/2002 |
| WO | 98/12862 | 3/1998 |
| WO | 99/46899 | 9/1999 |
| WO | 99/65152 | 12/1999 |
| WO | 00/23816 | 4/2000 |
| WO | 01/50151 A1 | 7/2001 |
| WO | 01/63316 | 8/2001 |

OTHER PUBLICATIONS

U.S. Appl. No. 10/057,741, filed Jan. 23, 2002, Spratt.

U.S. Appl. No. 10/057,742, filed Jan. 23, 2002, Spratt.

Bandyopadhyay, S., et al., "Using Mobile Agents for Off-Line Communication Among Mobile Hosts in a Large, Highly-Mobile Dynamic Networks," *IEEE International Conference on Personal Wireless Communications Proceedings*, pp. 88-92 (Feb. 17, 1999).

Cochrane, Peter, "The Market Impact of Fundamental Technology," Jun. 2000, 9 pages.

* cited by examiner

MESSAGE PASSING TO A KNOWN LOCATION

CROSS REFERENCE TO RELATED APPLICATIONS

The subject matter of the present application may also be related to the following U.S. patent applications: "Location Data Validation by Static Entities Receiving Location Data Items by Short-Range Communication," Ser. No. 10/057,741, filed Jan. 23, 2002; "Location Data Diffusion and Location Discovery," Ser. No. 09/905,774, filed Jul. 13, 2001; and "Location Data Dissemination and Reception for Entities Having Short-Range Receivers," Ser. No. 10/057,742, filed Jan. 23, 2002.

FIELD OF THE INVENTION

The present invention relates to passing a message, via mobile entities equipped with short range communication devices, to a target receiver at a known location.

BACKGROUND OF THE INVENTION

A number of technologies exist for the short range communication of information between mobile devices. These technologies include infra-red based technologies and low-power radio technologies (including, in particular, the recent "Bluetooth" short range wireless standard). Depending on the technology implementation, differing types of message propagation will be enabled including asynchronous message broadcast, and multicast and point-to-point duplex connections established after coordination and negotiation between communicating devices.

One possible use for such short-range technologies is the transmission of local information to passers-by equipped with mobile devices having short-range transceivers, the local information being, for example, transmitted by a shop to inform the passers-by of current promotions. Another use is in location beacons that transmit location information to passers-by.

It is known, for example from EP-A-0,948,222, to diffuse information amongst users by short range wireless links so that a user need not be in range of an originating transmitter in order to receive the information sent out by the latter. Such an arrangement is likely to be particularly useful in environments such as shopping malls, city centers, tourist attractions, theme parks or any other location where large numbers of users carrying mobile devices with short-range transceivers are likely to be in one locality. Another important area of application is the diffusion of information between devices fixed in cars.

FIG. 1 of the accompanying drawings depicts an information diffusion process in which an originating information point 10 (typically fixed, but not necessarily so) sends out the information over a short-range radio link to nearby mobile devices, in this case device 11. The receiving device 11 transmits on the information to a neighboring device 12 and then moves (see dashed arrow in FIG. 1) before sending on the information again to another device 14. Meanwhile mobile device 12 has moved into proximity with device 13 to which it also transmit the information. Device 13 now moves near to the device 14 and passes the latter the information—however, as device 14 already has the information from device 11, it ignores the copy from device 13. Device 13 also passes the information to a fixed relay transceiver which subsequently passes the information to a mobile device 15. Finally, device 15 passes the information to device 14 which has now within range of device 15; again, device 14 ignores the copy information from device 15.

It can be seen that information can be rapidly diffused among the population of mobile-device users in the general vicinity of the source 10. So, the process of diffusion takes advantage of both the short range wireless technology and the movement of the users carrying the devices.

By applying appropriate diffusion-limiting mechanisms (for example, by assigning the original information a total time to live of, for example, 10 minutes), the information will generally only be diffused in the vicinity of the originating point 10. This makes the diffusion process appropriate for the diffusion of location relevant information that is primarily of use only in the vicinity of point 10. Such location relevant information can include location data enabling a receiving device to obtain at least a rough idea of its location (though, of course, a number of technologies such as GPS and cellular radio already exist by which a mobile device can determine its position and, indeed, its direction of travel).

Whilst the general diffusion of information between mobile entities is appropriate for contacting people indiscriminately, it is not the most efficient way for one mobile entity to pass a message to a particular target entity.

It is an object of the present invention to provide a more efficient way for using mobile entities equipped with short-range transceivers for passing a message to an entity at a known location.

SUMMARY OF THE INVENTION

According to the present invention, there is provided a method of passing a message to a target receiver at a known location, wherein the message is carried towards the target receiver by one or more mobile entities that receive and pass on the message by short-range communication, the message including an indication of the location of the target receiver, and at least one of the mobile entities is used to carry the message only following a determination that its direction of travel is appropriate to progress the message on its way to the target receiver.

The present invention also encompasses mobile entities for implementing the foregoing method.

BRIEF DESCRIPTION OF THE DRAWINGS

Message passing methods and a message-carrying mobile device implementing these method, all embodying the invention, will now be described, by way of non-limiting example, with reference to the accompanying diagrammatic drawings, in which.

BEST MODE OF CARRYING OUT THE INVENTION

Figure 1:
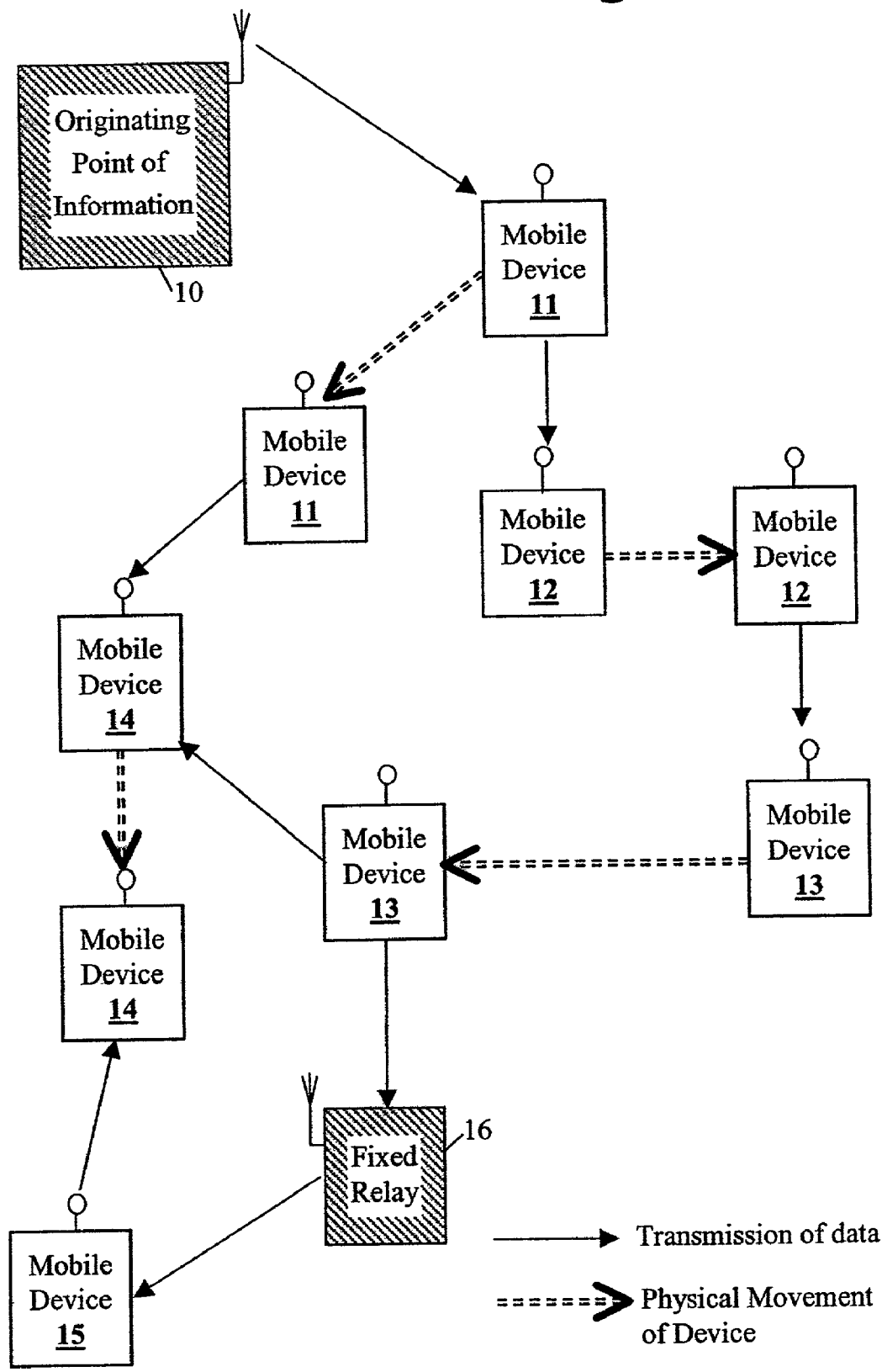
FIG. 1 is a diagram illustrating an information diffusion technique.
Figure 2:
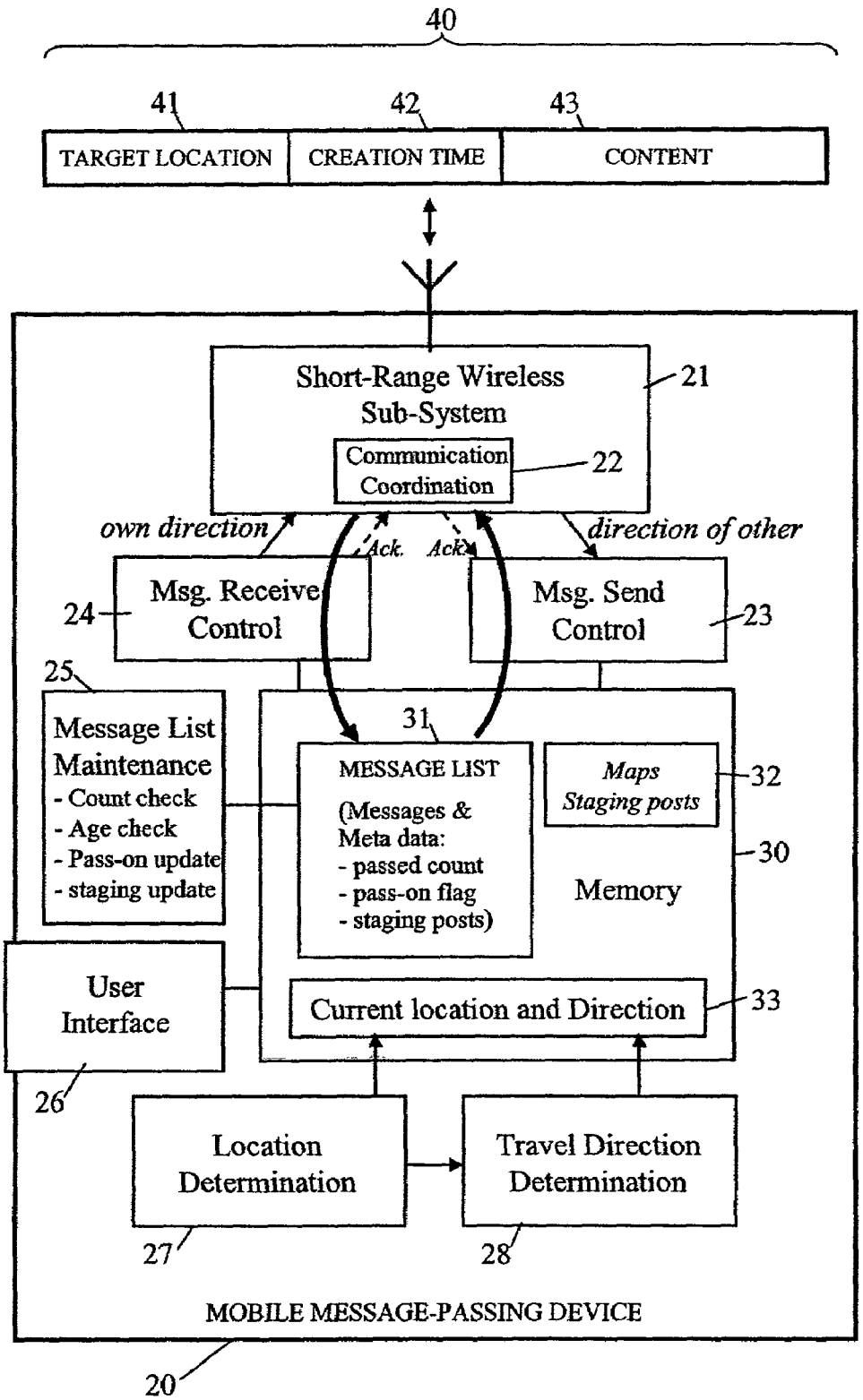
FIG. 2 is a diagram illustrating the main elements of the message-carrying mobile device.

FIG. 2 shows the main elements of a message-passing mobile device 20 embodying the present invention that can be installed in a vehicle or carried by a person; of course, for a vehicle, some or all of the functionality of the device 20 can be built into the vehicle.

The functional elements of the mobile device 20 comprise:

- a short-range wireless transceiver subsystem 21—for example, infrared-based or, preferably, radio-based such as a Bluetooth system—for receiving and transmitting messages 40 from/to nearby mobile devices of similar form; the short-range transceiver subsystem also serves to detect when other devices are nearby by, for example, sending/receiving intermittent signals; the subsystem 21 includes a communication coordination block 22 for coordinating the exchange of data between the device 20 and nearby devices;
- a memory 30 for holding a message list 31 (including messages and message meta data), map and staging post data 32, and the current location and direction of travel of the mobile device 20;
- a message-handling subsystem for handling and maintaining messages, this subsystem being made up of a user interface 26 for creating and reading messages, a message send control block 23, a message receive control block 24, and a message maintenance block 25;
- a location determination unit 27 such as a GPS unit and a direction of travel determination block 28 which can simply comprise a processing unit for determining from two or more successive location readings from unit 27, the current general direction of travel of the mobile device.

The mobile device 20 permits a user to send a message to a short-range receiver at a known location—this may be an unprompted message or a response to a message received from or about that location. For example, the user may receive, via device 20, a promotional message from a store at a location indicated in the message, e.g. "Product x is currently being promoted at half price in store y" (the store identity being a location indicator as it can be used to look up geographic coordinates of the store in a locally or remotely held table); the user may decide to send a reply message ("Reserve one of this product for me") or even in some applications have the device automatically send a reply.

By way of example, pedestrian K (FIG. 3) may wish to send a message from his short-range device 20 to a transceiver T located at a known location some distance from K. One way of doing this (after K has inserted the message into the memory of his mobile device 20 via user interface 26) would be to take advantage of message diffusion between short-range devices, K causing his mobile device to use a message diffusion or flooding protocol to try to send the message across intervening devices to T. However, such an approach will result in messages going off in all directions, many with little hope of ever reaching the target destination T.

In accordance with the present invention, an approach is therefore adopted whereby K's message is only carried by mobile devices going in a direction likely to progress the message on its way to its destination T; as will be seen, this does not necessarily mean that every device used to carry the message is actually moving generally in the direction of T since it may be expedient to first transport the message to a location from where it is more likely to be carried, or to be carried quickly, to T. As multiple devices 20 are likely to be involved in transferring the message to its destination location, the message itself should include the destination location (or at least an indicator of that location). The general form of a message 40 to be passed between devices 20 is shown in FIG. 2 and, as can be seen, the message comprises a message destination (target) location field 41, a message creation time field 42, and a message content field 43; the message may, of course, include other fields such as sending location.

Figure 3:
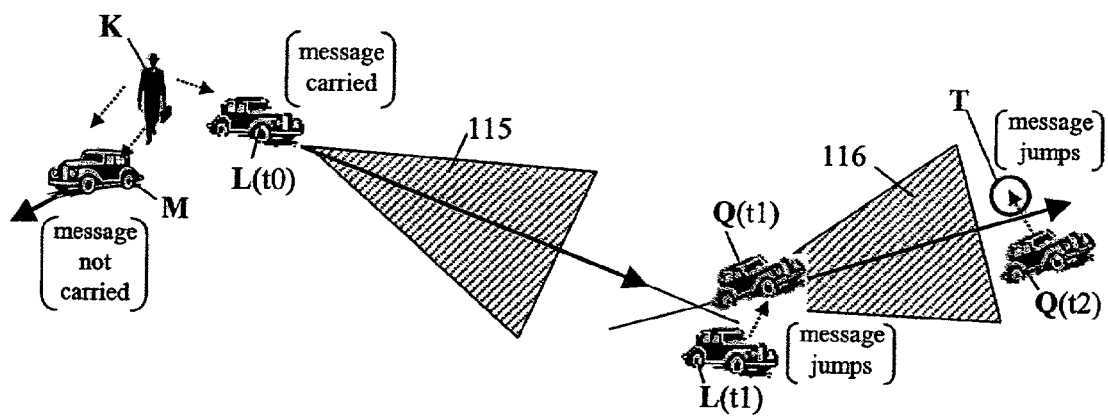
FIG. 3 is a diagram illustrating the message-passing method for a message being passed from a message-originating mobile device to a predetermined destination point using intermediate carriers traveling generally towards the destination.

For convenience, in the further description of the operation of mobile device 20 given with reference to FIG. 3, the reference K is used to encompass both the pedestrian K and K's mobile device 20 as may be appropriate.

The determination of whether a mobile device 20 passing close to K should be used to carry K's message can be effected either by K's mobile device or by the passing mobile device (or, indeed, by both devices in cooperation). In the case of the FIG. 2 device, this determination is effected by K's device after having received direction of travel information from the passing device. Where it is the passing device that decides whether to carry K's message, this will generally be done by K transferring to the passing device, either the direction to the target end location for K's message, or that location itself, to enable the passing device to determine whether it is moving in the general direction required; the transfer of K's message to the passing device can be done either at the same time as transferring the direction/end-location information (in which case the message is discarded if the passing device decides not to carry it), or only after the passing device has decided to carry the message.

Of course, for a device 20 carried by a vehicle, in view of the winding nature of many roads, the direction of travel should be based on an average over a reasonable distance (for example, a mile); it is also prudent to adopt a similar approach for devices carried by pedestrians (but with a lower averaging distance) since even in open spaces, pedestrians often do not walk in a straight line to their intended final destination.

In FIG. 3, K is being passed by vehicles L and M each equipped with a mobile device 20 (and, again, references L and M are used below to encompass these devices). K's mobile device 20 communicates with each of L and M in turn via the short-range radio subsystems of their respective devices. The operation of K's device for each passing device will be described below following a description of how the message is held and maintained in K's device 20.

K's message is stored in memory 30 in a message list 31 that holds messages being carried and, for each message, the following meta data:

- a count (the "pass count") of the number of times the message has been successfully transferred to another device)—this count is incremented by the send-control block 23;
- a "pass-on" flag which, if set, indicates that the device 20 should attempt to transfer the message to passing devices 20; and
- a staging-post identification list.

The message-list maintenance block 25 is responsible for maintaining the message list as follows. At frequent intervals, for each message in the list 31, the block 25:

- checks whether the pass count associated with the message has reached a predetermined upper bound (for example, ten) and, if so, the message and its meta data are deleted from the message list 31—in this manner, a message is only sent on a limited number of times by device 20;

checks the age of the message by comparing its creation time with an internal date/time clock of the device 20 (not shown)—messages over a certain age, such as 48 hours, are discarded along with their meta data;

updates the pass-on flag by determining whether or not the mobile device is moving generally towards the target T (the direction of T is derived from the device's current location and the known location of T)—in the present example, the pass-on flag is only set if the device 20 is not moving towards T;

updates the staging-post identification data.

A staging post is a location where messages can expect to be able to find a device (or other means) that will take the message towards T. A staging post might, for example, be a freeway intersection or, as will be seen below with reference to FIG. 4, a gateway to a fixed communication infrastructure. A list of staging posts is held in memory along with zone data indicating, for each staging post, zones served by the staging post—that is, zones to which a message reaching the staging post is likely to be able to get a lift from a passing device (or other means). The block 25 updates the staging-post identification data of a message by determining which staging posts can usefully be employed to move a message towards its destination. This determination involves determining which staging posts have zones that include the target destination of the message but do not cover the current location of the device; these staging posts are then identified in the staging-post identification data (it will be appreciated that the useful staging posts will change as a message moves towards its destination).

Upon another mobile device passing close to K, K's device 20 receives direction of travel information from the receive-control block 24 of the passing device 20 and, preferably, also an indication whether or not the passing device is vehicle borne. The send control block 23 then looks at each message in message list 31 to determine whether it would be useful to copy the message to the passing device. This determination is done as follows. First, a message is not considered for transfer unless either its "pass-on" flag is set or, where the device 20 holding the message is pedestrian borne, the passing device is detected as being a vehicle and therefore likely to get the message to its destination more quickly. The device 20 can know if it is pedestrian borne either because this is pre-specified (e.g. by device type or user input) or as a result of a speed of movement measurement made by the device using location data from unit 27 and elapsed time between two location readings).

If send control block 23 determines that a message is a candidate for transfer, it works out the direction from the device's current location to the message's target destination and compares this with the received direction information from the passing device; if these two directions are within a predetermined angular range of each other, the message is copied across to the passing device. If, however, the two directions are not within the predetermined angular range, the send-control block repeats the process taking as the message destination location the location of any staging post identified in the staging-post identification data associated with the message. If the direction to any such staging post is outside the predetermined angular range to the direction of travel of the passing device, the send control block terminates its consideration of the current message without copying it to the passing device.

The receive control block 24 of the passing device receives each copied-across message, stores it in its message list and sends an acknowledgment back to the sending device. The send control block of the sending device is triggered by this acknowledgment to increment the pass count of the corresponding message in its message list. As a variant, it is possible to arrange for the receive-control block 24 to examine the received message and make a determination (based on whatever criteria are judged appropriate, such as message size) whether it accepts to carry the message—if it doesn't then it does not acknowledge message receipt.

Returning to a consideration of the FIG. 3 example, since vehicle M is traveling away from the message target T, K determines that the message should not be passed to M. In contrast, vehicle L is traveling in a direction that is just within the predetermined angular range 115 of the direction to T so that K's message is copied to L where it is accepted by L for transport at time t0. The copying to L is done regardless of K's direction of travel because L indicated that it was a vehicle and K's device knew it was pedestrian borne.

Vehicle L carries the message but as it is not actually going past T, there quickly comes a point where the current direction from L to T is outside of the direction range 115. As a result, the pass-on flag associated with the message in L' device 20 is set to indicate that the message should be copied to any passing device moving in a more appropriate direction. In due course, at time t1, vehicle Q is encountered and L passes it the message—since Q is moving in the general direction of T so that the direction from the meeting point of L and Q to the target T falls within the angular direction range 116 of Q for accepting messages, Q accepts the message and continues on its way. In due course, at time t2, Q passes close by T and transfers the message directly to T.

Where a mobile device 20 has passed on a message at least a predetermined minimum number of times (one or more) and has ceased to move in an appropriate direction, the maintenance block 25 can be arranged to delete the message from message list 31.

Rather than waiting for the direction to the target T to go out of angular direction range for the carrying device 20, the carrying device can continuously look to pass on the message to any entity traveling in a direction more closely corresponding to the direction of T than its own direction of travel. Again, it is preferable for the message-passing entity to receive feedback on the success of any message passing operation.

Advantageously, the decision as to whether it is an appropriate for a passing device to carry a message is made not simply on the basis of direction data, but also taking into account map data that might show that the current direction of travel of the passing device, whilst being generally towards T, is actually leading to a cul-de-sac or other route which would not get to T. It is therefore possible that an appropriate direction of travel for the receiving devicey is actually in a direction away from the target destination—what is relevant here is whether the map route distance to T is being reduced by travel in the direction being taken by the receiving entity.

Upon target T receiving the message from K, T may decide to send an acknowledgement or return message towards the last known location of K (this location having been included for example in the message sent by K). Alternatively, if the message from T included a message identifier, this identifier could be included by T in a subsequent broadcast by T of location-relevant information, there being at least a possibility that the identifier will reach K and serve as a message acknowledgement.

Whilst the scenario depicted in FIG. 3 has the message carriers as vehicles, the message carriers could equally be pedestrians (for example, in a shopping mall).

Figure 4:
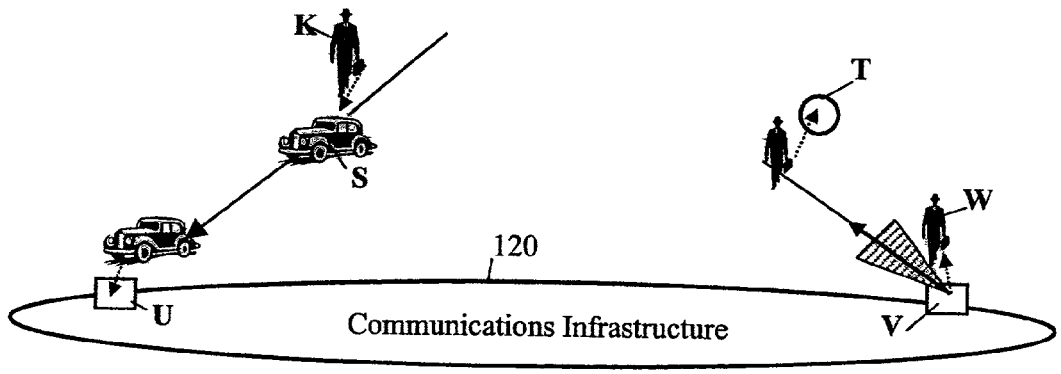
FIG. 4 is a diagram illustrating another message-passing method in which a communications infrastructure is used to assist in message transportation.

FIG. 4 shows another example of message carrying, this time involving the use of a communications infrastructure 120 to effect part of the message transportation. Where there is an extensive communications infrastructure already in place with short-range wireless access points such as points U and V, then message transport over substantial distances is probably most effectively undertaken by taking advantage of the communications infrastructure to do most (in distance terms) of the message transportation. In such cases, the access points can be defined as staging posts in the staging-post data held in the memory 30 of devices 20. Of course, it maybe that the access points are so prevalent that the initial direction of dispatch of a message by K is irrelevant, any direction being adequate to fairly quickly bring the message within range of a short-range wireless transceiver U of the infrastructure. Thus, in the FIG. 12 example, K dispatches a message for T via vehicle S that is actually traveling away from T. However, vehicle S shortly comes close to the wireless access point U and passes the message to the communications infrastructure. The message includes sufficient information on T to enable the infrastructure 120 to route the message to a short-range wireless transceiver V close to T (it being assumed that the target T is not directly connected to infrastructure itself). Onward transmission of the message from V is now done on the basis of directional selectivity of the carrier in the manner described above for the message passing effected in FIG. 3. In the present example, V passes the message to a pedestrian W that is heading in the general direction of T (that is, the direction from V to T lies within the angular direction range of the mobile device being carried by W). W therefore accepts the message and in due course passes close to T and delivers the message to T.

Many other variations are, of course, possible to the above-described arrangements. For example, with regard to the maps held by the mobile entities, the map data may be stored semi-permanently in the devices. Alternatively, the map data can be automatically downloaded—for example, when a pedestrian carrying a mobile device enters a shopping mall. A third possibility is that the map data is sent to mobile entities using diffusion.

It will be appreciated that any suitable coordinate system can be employed for specifying locations; for example a latitude/longitude based coordinate system can be used or a locally defined coordinate system (the latter potentially being more appropriate for use in an environment such as a shopping mall or theme park).

The invention claimed is:

1. A method of passing a message to a target receiver at a known location, wherein the message is physically carried towards the target receiver by one or more mobile entities that receive and pass on the message by short-range communication, the message including an indication of the location of the target receiver, and at least one of the mobile entities is used to carry the message only following an immediately-prior determination that its direction of travel is appropriate to physically carry the message in a direction that progresses the message on its way to the target receiver.

2. A method according to claim 1, wherein a said at least one mobile entity is determined to be travelling in an appropriate direction upon this direction approximating to the direction towards the target receiver.

3. A method according to claim 1, wherein a said at least one mobile entity is determined to be travelling in an appropriate direction upon this direction taking it along a map route in a direction reducing the route distance to the target receiver.

4. A method according to claim 1, wherein a said at least one mobile entity is determined to be travelling in an appropriate direction upon this direction approximating to the direction towards an intermediate location predetermined as being one where the message is at least likely to encounter another mobile entity, or other means, for progressing the message towards the target receiver.

5. A method according to claim 1, wherein said determination is effected by an entity already holding the message.

6. A method according to claim 5, wherein the message-holding entity effects said determination by the steps of:
   receiving, from the nearby said at least one of the mobile entities, the latter's direction of travel;
   deriving, as a reference direction, the direction from its own location to that of the target receiver or of an intermediate location predetermined as being one where the message is at least likely to encounter another mobile entity, or other means, for progressing the message towards the target receiver; and
   comparing the said direction of travel of the nearby mobile entity with the reference direction and determining that the nearby mobile entity is appropriate to carry to the message only upon the compared directions being within a predetermined angular range of each other.

7. A method according to claim 1, wherein said determination is effected by the concerned said at least one of the mobile entities.

8. A method according to claim 7, wherein the concerned said at least one of the mobile entities effects said determination by the steps of:
   receiving a reference direction from the entity already holding the message, this reference direction being the direction from the location of the message-holding entity to that of the target receiver or of an intermediate location predetermined as being one where the message is at least likely to encounter another mobile entity, or other means, for progressing the message towards the target receiver; and
   comparing the said direction of travel of said at least one of the mobile entities with the reference direction and determining that it is appropriate to carry to the message only upon the compared directions being within a predetermined angular range of each other.

9. A method according to claim 7, wherein the concerned said at least one of the mobile entities effects said determination by the steps of:
   receiving, from the entity already holding the message, the location of the target receiver or of an intermediate location predetermined as being one where the message is at least likely to encounter another mobile entity, or other means, for progressing the message towards the target receiver;
   deriving, as a reference direction, the direction from its current location to the received location; and
   comparing its direction of travel with the reference direction and determining that it is appropriate to carry to the message only upon the compared directions being within a predetermined angular range of each other.

10. A method according to claim 1, wherein a said at least one mobile entity, when carrying the message, seeks to pass on the message to another mobile entity upon its direction of travel no longer being appropriate to progress the message on its way to the target receiver.

11. A method according to claim 1, wherein a said at least one mobile entity, when carrying the message, opportunistically passes the message to another mobile entity that is travelling in a direction more closely aligned to one appropriate to progress the message on its way to the target receiver.

12. A method according to claim 1, wherein a said at least one mobile entity, when carrying the message, opportunistically passes the message to another mobile entity that is travelling, at a substantially greater speed than the current message-carrying entity, in a direction appropriate to progress the message on its way to the target receiver.

13. A method according to claim 1, wherein a said at least one mobile entity, when passing on the message, seeks to pass the message to multiple other mobile entities travelling in respective directions appropriate to progress the message on its way to the target.

14. A method according to claim 1, wherein a said at least one mobile entity, when passing on the message, is informed by the message-receiving mobile entity as to whether the latter has accepted to carry the message.

15. A method according to claim 1, wherein the message is routed through a communications infrastructure to a short-range transmitter close or closest to the target receiver and the latter then passes the message to a said at least one mobile entity.

16. A method according to claim 15, wherein the message is passed from an originating entity to the communications infrastructure via one or more mobile entities that are used to carry the message regardless of their direction of travel.

17. A method of passing a message to a target receiver at a known location, wherein the message is physically carried towards the target receiver by one or more mobile entities that receive and pass on the message by short-range communication, the message including an indication of the location of the target receiver, and at least one of the mobile entities knowing at least its approximate location and direction of travel and being used to carry the message only upon the entity being determined to be currently travelling in a direction appropriate to physically carry the message in a direction that progresses the message towards the target.

18. Apparatus for passing a message to a mobile entity travelling in a direction appropriate to progress the message on its way to a target receiver the location of which is indicated in the message, the apparatus comprising:
- a short-range transceiver capable of determining the presence nearby of said mobile entity and of exchanging data with it;
- a location discovery arrangement by which the apparatus can know its location;
- a memory for holding the message; and
- a send control subsystem for enabling the passing of the message, via the short-range transceiver, to said mobile entity only upon determining that the current direction of travel of the mobile entity, as indicated by direction data received from the mobile entity, is appropriate to physically carry the message in a direction that progresses the message on its way to the target receiver.

19. Apparatus according to claim 18, wherein the send control subsystem comprises:
- a direction-derivation arrangement for deriving, as a reference direction, the direction from its own location as indicated by said location discovery means, to that of the target receiver or of an intermediate location predetermined as being one where the message is at least likely to encounter another mobile entity, or other means, for progressing the message towards the target receiver; and
- a comparison arrangement for comparing the direction of travel of the nearby mobile entity with the reference direction and determining that the nearby mobile entity is appropriate to carry to the message only upon the compared directions being within a predetermined angular range of each other.

20. A mobile entity for receiving a message, and storing it for carriage, when travelling in a direction appropriate to progress the message on its way to a target receiver the location of which is indicated in the message, the apparatus comprising:
- a short-range transceiver capable of determining the presence nearby of apparatus holding the message, and of exchanging data with the apparatus;
- a direction-of-travel discovery arrangement by which the mobile entity can determine at least its general direction of travel;
- a memory for storing the message; and
- a receive control subsystem for enabling the storage for carriage of said message, only upon determining that the direction of travel of the mobile entity, is appropriate to progress the message on its way to the target receiver as indicated by direction data received from the apparatus via the short-range subsystem.

21. A mobile entity for receiving a message, and storing it for carriage, when travelling in a direction appropriate to progress the message on its way to a target receiver the location of which is indicated in the message, the apparatus comprising:
- a short-range transceiver capable of determining the presence nearby of apparatus holding the message, and of exchanging data with the apparatus;
- a location and direction-of-travel discovery arrangement by which the mobile entity can determine at least its general location and direction of travel;
- a memory for storing the message; and
- a receive control subsystem for enabling the storage for carriage of said message, only upon determining that the current direction of travel of the mobile entity, is appropriate to physically carry the message in a direction that progresses the message on its way to the target receiver as indicated by a reference direction determined by the mobile entities current location and a location passed to it from the apparatus via the short-range subsystem.

* * * * *